United States Patent
Kondo et al.

(10) Patent No.: US 7,406,959 B2
(45) Date of Patent: Aug. 5, 2008

(54) ENGINE CONTROL SYSTEM

(75) Inventors: Nobuhiro Kondo, Tokyo (JP);
Yoshinaka Takeda, Tokyo (JP);
Yasuhiro Tsutsui, Tokyo (JP);
Yoshinori Takahashi, Tokyo (JP);
Minehiro Murata, Tokyo (JP)

(73) Assignee: Mitsubishi Fuso and Bus Corporation, Tokyo (JP)

( * ) Notice: Subject to any disclaimer, the term of this patent is extended or adjusted under 35 U.S.C. 154(b) by 57 days.

(21) Appl. No.: 11/628,652

(22) PCT Filed: Jun. 2, 2005

(86) PCT No.: PCT/JP2005/010542

§ 371 (c)(1),
(2), (4) Date: Dec. 6, 2006

(87) PCT Pub. No.: WO2005/121530

PCT Pub. Date: Dec. 22, 2005

(65) Prior Publication Data

US 2008/0017175 A1    Jan. 24, 2008

(30) Foreign Application Priority Data

Jun. 7, 2004    (JP) .............................. 2004-168252

(51) Int. Cl.
*F02M 25/07* (2006.01)
*F02M 51/00* (2006.01)
*F02D 9/02* (2006.01)
*F02B 47/08* (2006.01)
*F02B 33/44* (2006.01)

(52) U.S. Cl. .................. 123/568.21; 123/399; 123/478; 123/568.11; 123/568.12; 60/605.2

(58) Field of Classification Search ................. 123/299, 123/300, 305, 399, 478, 480, 493, 568.11, 123/568.12, 568.16, 568.19, 568.21; 60/274, 60/276, 278, 279, 284, 285, 295, 299, 311, 60/605.2; 701/101–105, 108, 114
See application file for complete search history.

(56) References Cited

U.S. PATENT DOCUMENTS 5,546,915 A    8/1996    Isobe (Continued)

FOREIGN PATENT DOCUMENTS

FR    2833653 A1 *    6/2003    ............ 123/568.12

(Continued)

*Primary Examiner*—Willis R Wolfe, Jr.
(74) *Attorney, Agent, or Firm*—Jacobson Holman PLLC (57) ABSTRACT

An engine control system includes an EGR device 10 which connects an exhaust passage Ex and an intake passage I and has an EGR valve; an intake throttle valve 41 placed in the intake passage I; and an engine control unit which is provided with an engine operation data calculator A1 accumulating mileages of a vehicle or an engine operation period, a fuel injection controller A2 controlling a fuel injection amount and a fuel injection timing, an EGR controller A3 controlling an opening of the EGR valve; a throttle valve controller A4 controlling an opening of the intake throttle valve; and an EGR passage cleaning controller A5 which delays a fuel injection timing Tn, increases an opening β g of the EGR valve, and reduces an opening θ s of the intake throttle valve when the total mileage or the total operation period calculated by the engine operation data calculator becomes equal to a predetermined threshold.

7 Claims, 6 Drawing Sheets

U.S. PATENT DOCUMENTS

| | | | |
|---|---|---|---|
| 6,209,515 B1 * | 4/2001 | Gotoh et al. | 123/568.21 |
| 6,212,881 B1 * | 4/2001 | Takahashi et al. | 123/568.21 |
| 7,111,455 B2 * | 9/2006 | Okugawa et al. | 60/285 |
| 7,198,039 B2 * | 4/2007 | Takemoto et al. | 123/568.21 |
| 7,246,485 B2 * | 7/2007 | Ohki et al. | 60/285 |
| 7,281,529 B2 * | 10/2007 | Lew et al. | 123/568.12 |
| 7,284,544 B2 * | 10/2007 | Hatano | 123/568.12 |
| 2006/0272625 A1 * | 12/2006 | Wang | 123/568.21 |
| 2007/0084206 A1 * | 4/2007 | Lew et al. | 60/605.2 |

FOREIGN PATENT DOCUMENTS

| | | |
|---|---|---|
| JP | 8061156 | 3/1996 |
| JP | 2000097017 | 4/2000 |
| JP | 2000186631 | 7/2000 |
| JP | 2001159311 | 6/2001 |
| JP | 2001303928 | 10/2001 |
| JP | 2002309987 | 10/2002 |
| JP | 2003184593 | 7/2003 |

* cited by examiner

Fig. 6

ENGINE CONTROL SYSTEM

CROSS REFERENCE TO RELATED APPLICATIONS

This application is based upon and claims the benefit of priority from prior PCT application No. PCT/JP2005/010542 filed on Jun. 2, 2005 (based on Japanese Patent Application No. 2004-168,252 filed on Jun. 7, 2004), the entire contents of which are incorporated by reference herein.

BACKGROUND OF THE INVENTION

1. Field of the Invention

This invention relates to an engine control system, and more particularly relates to an engine control system which can remove stains, soot, particulates and so on from an exhaust gas recirculating passage.

2. Description of the Related Art

In order to detoxify exhaust gases, an engine is generally provided with not only filters, catalyzers and so on which constitute an exhaust emission control unit, but also an exhaust gas recirculating (EGR) device recirculating exhaust gases to a combustion chamber, thereby preventing NOx from being discharged to the exterior.

For instance, Japanese Patent Laid-Open Publication No. 2002-309,987 (called the "Reference 1") describes an exhaust gas denitrifying device which includes a NOx absorbent in an engine exhaust passage and an exhaust gas recirculating unit (EGR) in order to recirculate exhaust gases to a combustion chamber. The NOx absorbent usually absorbs NOx, and discharges NOx when an air-fuel ratio is low in the combustion chamber. In other words, NOx is reduced using carbon monoxide (CO) and hydro carbon (HC). Conversely, in order to reduce the air-fuel ratio, an EGR control valve is opened in order to recirculate exhaust gas, to decrease an amount of intake air, and to increase an amount of fuel to be injected, thereby preventing an engine output torque from being changed.

Further, Japanese Patent Laid-Open Publication No. 2000-186,631(Reference 2) describes an internal combustion engine, which includes an EGR device in order to recirculate combustion gases into an EGR passage of the EGR device, and in order to burn SOF (soluble organic fractions), soot and so on accumulated in the EGR device when the engine stops operating.

In Reference 1, a bypass having a large quantity EGR valve is utilized together with an ordinary EGR passage when the engine is operating at a low air-fuel ratio. Recirculation of a large amount of exhaust gases reduces NOx to be discharged, so that a NOx occluding catalyzer may be downsized. However, during the engine operation with the low air-fuel ratio, EGR gases contain a lot of unburned gas (HC) and soot, which stick on and contaminate an EGR pipe, an EGR cooler, an EGR valve, an intake manifold and so on. As a result, the EGR valve will fail to quickly open or close, or the EGR pipe will be clogged.

In the internal combustion engine with the EGR device in the Reference 2, gases burnt by the combustion-based heater are introduced into the EGR passage when the engine stops operating, so that SOF, soot or the like accumulated in the EGR device will be burnt. However, the combustion-based heater tends to enlarge the EGR device, which is difficult to be mounted on a vehicle. Further, since the EGR device is cleaned when the engine stops operating, hot exhaust gases may be emitted via an exhaust pipe even during the non-operation of the engine.

SUMMARY OF THE INVENTION

The present invention has been contemplated in order to overcome problems of the related art, and is intended to provide an engine control system in which an exhaust gas recirculation unit can be easily cleaned under control of an engine control unit, and valves can reliably and smoothly operate without clogging.

According to the invention, there is provided an engine control system including: an EGR device connecting an exhaust passage and an intake passage and including an EGR valve; an intake throttle valve placed in the intake passage; and an engine control unit which is provided with an engine operation data calculator accumulating mileages of a vehicle or an engine operation period, a fuel injection controller controlling a fuel injection amount and a fuel injection timing, an EGR controller controlling an opening of the EGR valve, a throttle valve controller controlling an opening of the intake throttle valve, and an EGR passage cleaning controller delays the fuel injection timing, increases an opening of the EGR valve, and reduces an opening of the intake throttle valve when the total mileage or the total operation period calculated by the engine operation data calculator becomes equal to a predetermined threshold.

The engine control unit can reliably increase a temperature of exhaust gases discharged into an exhaust passage. Hot exhaust gases are recirculated to the exhaust gas recirculation unit, which is cleaned by hot exhaust gases.

BRIEF DESCRIPTION OF THE DRAWINGS

FIG. 4(A-1), FIG. 4(A-2), FIG. 4(B-1), FIG. 4(B-2), FIG. 4(C-1), FIG. 4(C -2), FIG. 4(D-1), and FIG. 4(D-2) respectively show computing maps used by the engine control unit; FIG. 4(A-1), FIG. 4(B-1), FIG. 4(C-1) and FIG. 4(D-1) show amounts of fuel to be injected, fuel injection timings, EGR passage openings, throttle valve openings, and turbo vane openings during the normal operation of an engine; and FIG. 4(A-2), FIG. 4(B-2), FIG. 4(C-2) and FIG. 4(D-2) show amounts of fuel to be injected, fuel injection timings, EGR passage openings, throttle valve openings, and turbo vane openings during a cleaning mode of the engine;

DETAILED DESCRIPTION OF THE INVENTION

Figure 1:
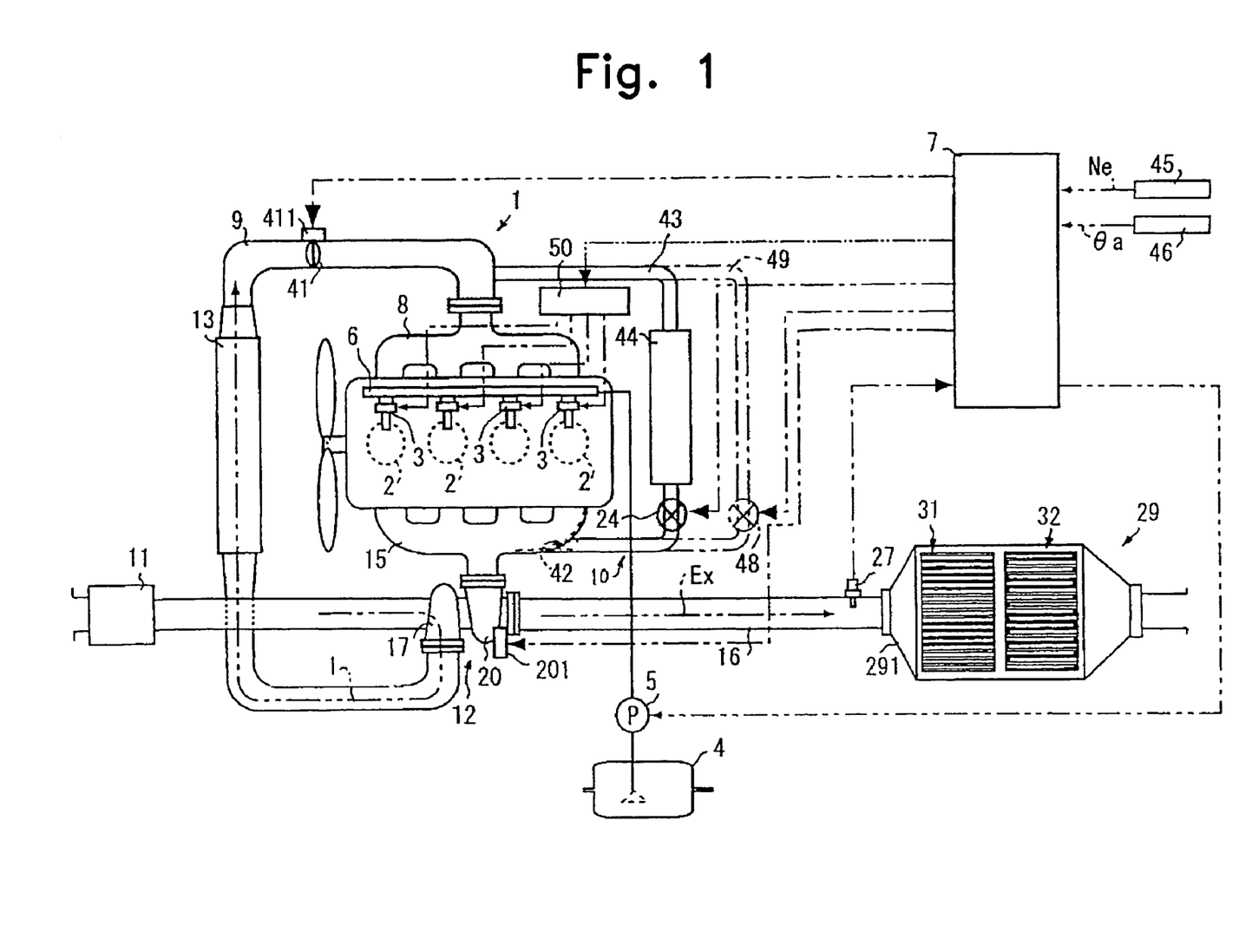
FIG. 1 shows an overall configuration of an engine control system according to one embodiment of the invention.

The following describe a diesel engine 1 (called the "engine 1") which is provided with an engine control system according to one embodiment of the invention.

The engine 1 includes four combustion chambers 2 connected in series. Each combustion chamber 2 has a fuel injection valve 3. Fuel (diesel oil) is housed in a fuel tank 4, is pressurized by a high pressure injection pump 5, is introduced into a common rail 6 (accumulator), and is injected into each cylinder via each fuel injection valve 3. An amount Qn of fuel to be injected and a fuel injection timing Tn of each fuel injection valve are controlled in response to a fuel control signal from an engine control unit (ECU) 7, which is installed in a vehicle provided with the engine 1, and will be described later.

Each intake port (not shown) extending from one side of each combustion chamber 2 communicates with an intake manifold 8, to which an intake pipe 9 is connected via a compressor 17 of a supercharger 12. The intake pipe 9 constitutes an intake passage I. Air is sucked in via an air cleaner 11, and is pressurized by the compressor 17. An amount of intake air is regulated by an intake throttle valve 41. Intake air is cooled by an inter-cooler 13, and is introduced into the intake manifold 8 via the intake pipe 9. An actuator 411 of the intake throttle valve 41 is controlled by the ECU 7.

Each exhaust port (not shown) extending from the other side of each combustion chamber 2 communicates with an exhaust manifold 15, to which an exhaust pipe 16 is connected via a turbine 20 of the supercharger 12. The exhaust pipe 16 forms an exhaust passage Ex. The supercharger 12 is placed around the turbine 20, includes a number of moving vanes (not shown) which are simultaneously actuated by an actuator 201, and functions as a VG turbocharger which can vary a flow rate of exhaust gases. The actuator 201 is controlled by the ECU 7.

Near the intake manifold 8, the intake pipe 9 communicates with an EGR inlet 42 upstream of the exhaust turbine 20 via an exhaust gas recirculation passage 43 (called the "EGR passage 43"). An exhaust gas recirculation control valve 24 (called the "EGR valve 24") is provided in the EGR passage 43, and varies an open area of the EGR passage 43. In addition, an EGR cooler 44 is provided around the EGR passage 43. The operation of the EGR valve 24 is controlled by the ECU 7. The turbine 20 of the supercharger 12 is positioned downstream of the EGR inlet 42, and receives relatively hot EGR gases.

A NOx sensor 27 detecting an amount of NOx, a catalytic converter 29, and a silencer (not shown) are placed in series downstream of the exhaust pipe 16.

The catalytic converter 29 includes a NOx occluding catalyst 31 and a diesel particulate filter 32 which are housed in a casing 291 along the length thereof.

The ECU 7 receives, via an input port (not shown), pulse signals from an engine speed sensor 45, which is placed near a crankshaft (not shown). The pulse signals are produced each time the crankshaft rotates by a specified angle, and are used to calculate an engine speed Ne and fuel injection timings. An accelerator opening sensor 46 is positioned near an accelerator (not shown), and produces signals representing accelerator openings $\theta$ a. The NOx sensor 27 produces signals representing a NOx density, which are transmitted to the input port of the ECU 7.

An output port (not shown) of the ECU 7 is connected to the fuel injection valves 3 via a fuel injection circuit 50 in order to control the amount Qn of fuel to each cylinder and the fuel injection timing Tn. Further, the output port is connected to the high pressure fuel pump 5 via a driving circuit (not shown), so that the ECU 7 controls an amount of pressurized fuel to the common rail 6 from the high pressure fuel pump 5.

Figure 2:
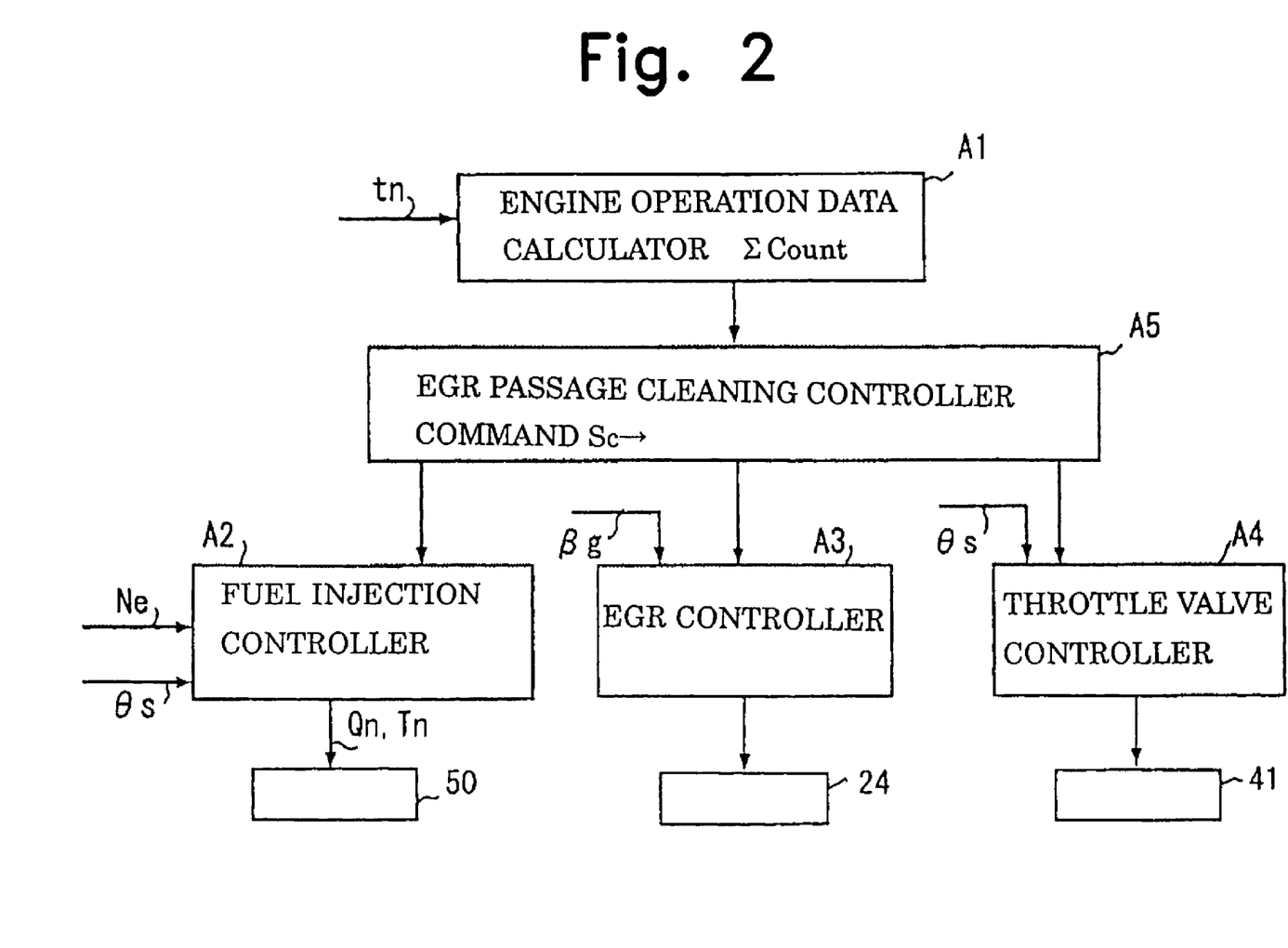
FIG. 2 is a block diagram showing functions of an engine control unit of the engine control system of FIG. 1, the functions being related to exhaust emission control.

The ECU 7 controls the engine 1, and functions as a driving data calculator A1, a fuel injection controller A2, an EGR controller A3, a throttle controller A4, and an EGR valve cleaning controller A5, all of which are related to exhaust gas emission control of the engine 1.

During the operation of the engine 1, the driving data calculator A1 sums up counts tn, which correspond to mileages of the vehicle or operating periods of the engine, and are added for each unit mileage or at each operation period of the engine. The driving data calculator A1 sequentially derives sums ($\Sigma$ Count$\leftarrow\Sigma$ Count+tn).

The fuel injection controller A2 calculates a basic fuel injection amount Q0 and a basic fuel injection timing T0 on the basis of the accelerator opening $\theta$ a and the engine speed Ne detected by the accelerator opening sensor 46 and the engine speed sensor 45. The fuel injection controller A2 revises the basic fuel injection amount Q0 depending upon an engine operation state, thereby deriving the fuel injection amount Qn, and revises the basic fuel injection timing T0 depending upon the engine operation state, and derives the fuel injection timing Tn. The fuel injection amount Qn and the fuel injection timing Tn are set in the fuel injection driver 50, so that fuel injection can be controlled.

In response to the EGR valve opening signal $\beta$ g of the EGR valve 24, the EGR controller A3 changes an opening of the EGR valve 24. Under the normal operation of the engine 1, exhaust gas recirculation control is executed with an EGR flow rate of 50% or less, which is effective in reducing NOx.

The throttle valve controller A4 controls an opening $\theta$ s of the intake throttle valve 41 in response to a throttle valve opening signal.

The EGR passage cleaning controller A5 issues an EGR passage cleaning command Sc whenever the mileage or the engine operation period calculated by the driving data calculator A1 reaches a predetermined threshold Limit. The EGR passage cleaning controller A5 delays the fuel injection timing Tn1 by $-\Delta T$ and sets it to a Tn2 (a main fuel injection timing during cleaning of EGR passage), increases a normal EGR valve opening $\beta$g1 to $\beta$g2 (an EGR valve opening during cleaning of EGP. passage), and adjusts a normal throttle valve opening $\theta$s1 to $\theta$s2 (a throttle valve opening during cleaning of the EGR passage).

Figure 6:
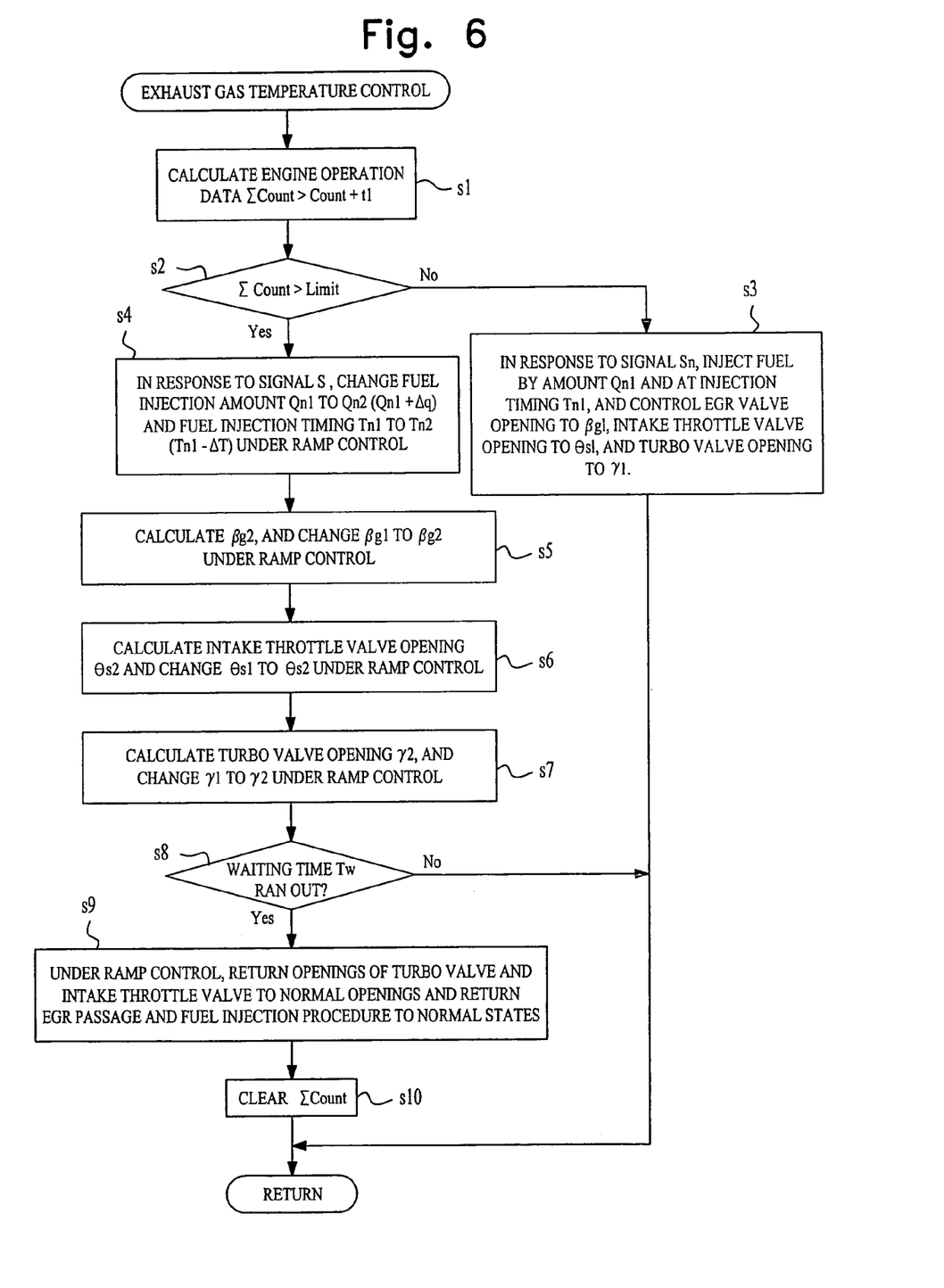
FIG. 6 is a flowchart of an exhaust gas temperature control routine conducted by the engine control unit.

The operation of the ECU7 will be described with reference to an exhaust gas temperature controlling routine shown in FIG. 6. This routine is executed as interrupt control during a main routine (not shown).

Figure 3A:
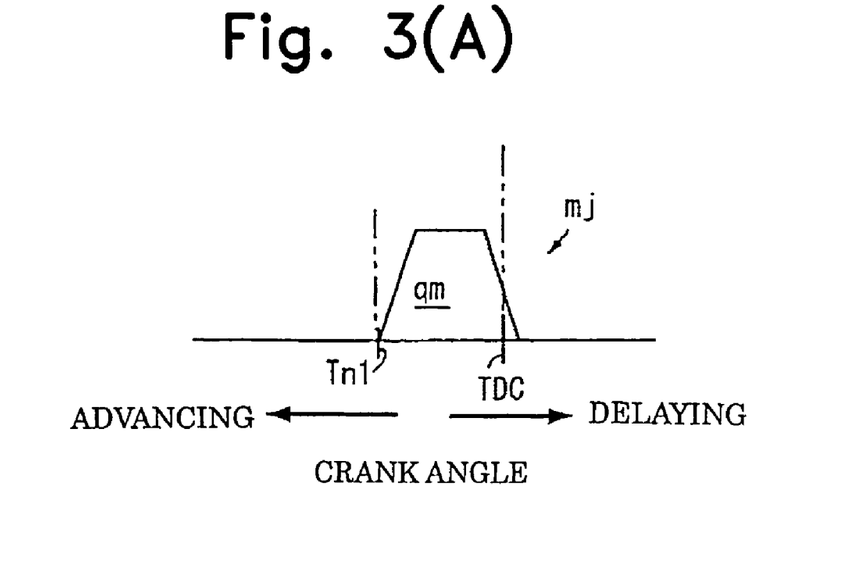
FIG. 3(A) shows a main fuel injection mode of the engine control unit.
Figure 4:
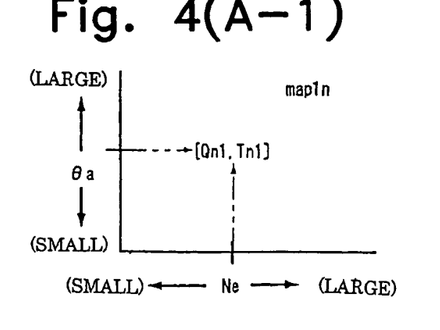

When a key switch (not shown) of the engine 1 is turned on and the main routine proceeds to step s1, the count tn (which corresponds to the current mileage or the engine operation period) is added to the previous count $\Sigma$ Count (which is zero at the initial count), so that a latest count is derived. In step s2, it is checked whether or not the latest $\Sigma$ Count is above the threshold Limit. When the latest $\Sigma$ Count is above the threshold Limit, a normal operation command Sn is issued in step s3. In response to the normal operation command Sn, the fuel injection control is executed on the basis of the latest operation information. A normal fuel injection timing map map1$n$ shown in FIG. 4(A-1) is used for this purpose. A normal fuel injection amount Qn1 and a normal fuel injection timing Tn1 shown in FIG. 3(A) are calculated on the basis of the engine speed Ne and the accelerator opening $\theta$ a. A fuel control signal representing the calculated values is sent to the fuel injection driver 50, thereby controlling each fuel injection valve 3 for the purpose of a main fuel injection mj.

Further, a normal EGR valve opening corresponding to the engine speed Ne and the accelerator opening $\theta$ a is calculated on the basis of a normal EGR valve opening map2$n$ (shown in FIG. 4(B-1)). Therefore, the EGR valve 24 is opened by the normal EGR valve opening $\beta$ g1 in order to reduce NOx.

Still further, the normal throttle valve opening θ s1 (a large opening), which corresponds to the engine speed Ne and the accelerator opening angle θ a, is calculated on the basis of a normal throttle opening map map3$n$ (shown in FIG. 4(C-1)). The intake throttle valve 41 opens by the calculated angle, and remains at the calculated angle.

A turbo vane opening γ1 is changed to a normal large opening in accordance with a normal turbo map (shown in FIG. 4(D-1)).

Exhaust gases are introduced into the catalytic converter 29 in response to the ordinary operation command Sn in steps s1 to s3.

An amount of discharged NOx, which depends upon data on a NOx density detected by the NOx sensor 27 and the engine operation state, is calculated in the main routine. Whenever the calculated value becomes equal to a threshold, the engine 1 is operated in a fuel rich state for a certain period of time under interrupt control. Therefore, the NOx occluding catalyst 31 is forcibly maintained in a fuel rich atmosphere, and discharges NOx for the purpose of NOx reduction and cleaning. This is effective in preventing NOx from being discharged due to saturation of the NOx occluding catalyst 31.

A diesel particulate filter 32 catches particulates in exhaust gases, so that the particulates will be burnt and removed when the engine 1 is operating at a specified temperature above 500° C. to 550° C. of exhaust gases.

Figure 3B:
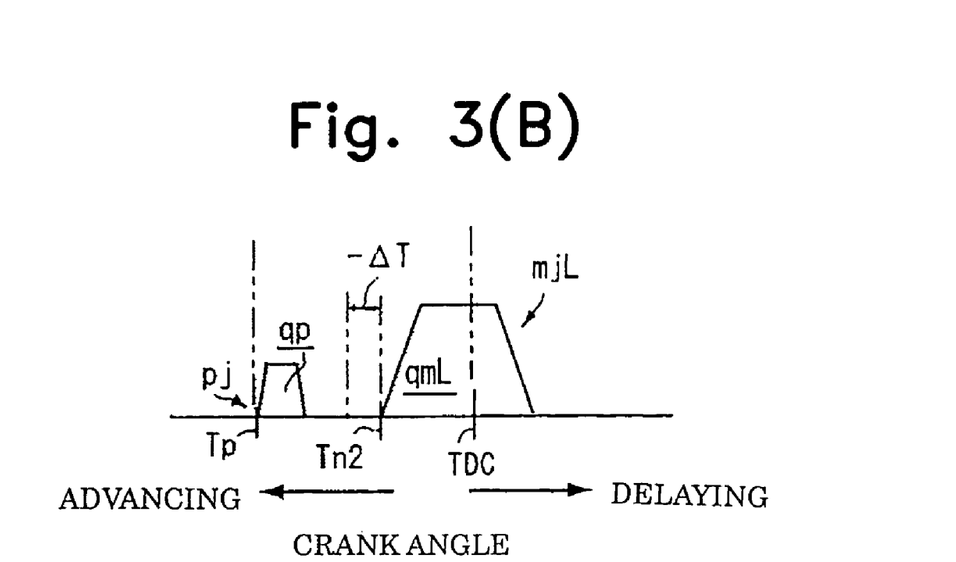
FIG. 3(B) shows a pilot-and-main fuel injection mode of the engine control unit.

The control procedure returns to step s2. When the latest ΣCount is above the threshold Limit, an EGR passage cleaning command Sc is issued in step s4. The EGR passage is cleaned in accordance with an amount of cleaning fuel based on the latest operation data and in accordance with a cleaning fuel injection timing map map1$h$. In this state, the following are calculated as shown in FIG. 4(A-2): a cleaning fuel injection amount Qn2 (=qp+qmL: qp denoting an amount of fuel injected by the pilot fuel injection, and qmL denoting an amount of fuel injected by the main fuel injection); a pilot fuel injection timing Tp and a main fuel injection timing Tn2 (=Tn1−ΔT) during the cleaning. Fuel control signals corresponding to the calculated values are transmitted to the fuel injection driver 50. In response to the fuel control signals, the respective fuel injection valves 3 are controlled for a pilot fuel injection pj and a delayed main fuel injection mjL (i.e., the main fuel injection mj is delayed by −ΔT when the EGR passage cleaning command Sc is issued). Refer to FIG. 3(B). The main fuel injection pj is conducted in response to the normal operation command Sn as shown in FIG. 3(A). However, the pilot fuel injection pj is performed prior to the delayed main fuel injection mjL in response to the command Sc. Further, fuel is injected at the main fuel injection timing Tn2 delayed by (Tn1−ΔT) after the pilot fuel injection pj.

The cleaning fuel injection amount Qn2 is equal to the pilot fuel injection amount qp and the main fuel injection amount qmL (which depends upon the accelerator opening θ a and so on), and is larger than the normal fuel injection amount Qn1 (=qm). In short, the cleaning fuel injection amount Qn2 is 1.3 to 1.5 times as large as the normal fuel injection amount Qn1.

The temperature of exhaust gases to be discharged into the exhaust manifold 15 can be reliably raised on the basis of the main fuel injection timing Tn2 and the cleaning fuel amount Qn2.

Figure 5A:
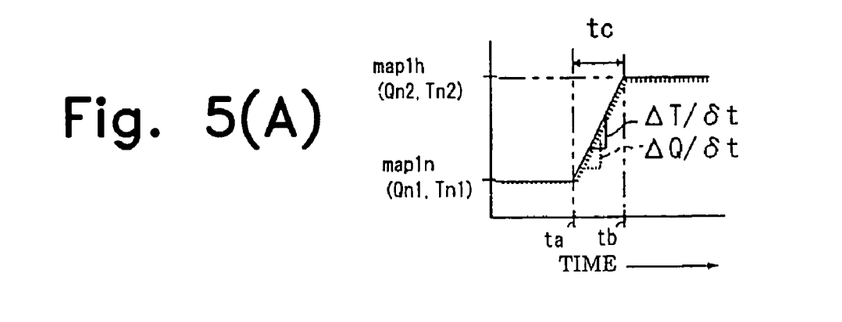
FIG. 5(A) shows ramp control of an amount of fuel to be injected and a fuel injection timing of the engine control unit.

The normal fuel injection timing Tn1 and the normal fuel injection amount Qn1 in step s3 are changed over to the cleaning fuel injection timing Tn2 and the cleaning fuel injection amount Qn2 in step s4. In this case, ramp control shown in FIG. 5(A) is conducted during a predetermined switchover period tc. In other words, the normal fuel injection timing Tn1 is gradually corrected to the cleaning fuel injection timing Tn2 by each delay ΔT/δ t. Similarly, the normal fuel injection amount Qn1 is gradually increased to the cleaning fuel amount Qn2 by each increase Δ Q/δ t. Therefore, it is possible to alleviate shocks caused by ramp control of the fuel injection amount and the fuel injection timing.

Figure 5B:
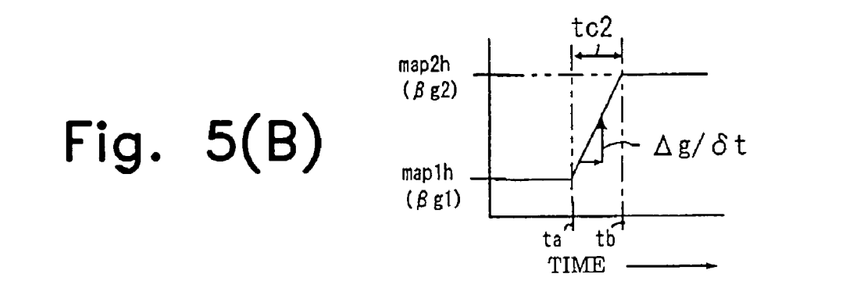
FIG. 5(B) shows the ramp control of an EGR passage opening.

In step s5, the opening of the EGR valve 24 is adjusted to the EGR valve cleaning opening β g2 (large opening) in response to the EGR passage cleaning command Sc, thereby increasing the EGR gases. Therefore, the EGR gas temperature is raised. Further, particulates can be easily removed from the EGR passage 43, EGR valve 24, intake manifold 8 and so on which constitute the EGR device 10. In this case, the normal EGR flow rate is switched over to the cleaning EGR flow rate under ramp control as shown in FIG. 5(B). Therefore, the normal EGR valve opening β gl is increased to the EGR valve cleaning opening β g2 by each increase Δ g/δ t during the switchover period tc2. This is effective in alleviating shocks caused by the switchover of the normal EGR flow rate to the cleaning EGR flow rate.

Figure 5C:
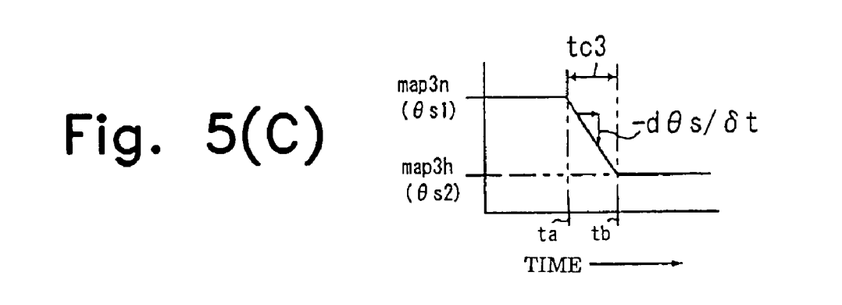
FIG. 5(C) shows the ramp control of a throttle opening.

In step s6, the intake throttle valve cleaning opening θ s2 is calculated on the basis of the engine speed Ne and the accelerator opening θ a map map3$h$ (FIG. 4(C-2). The intake throttle valve 41 is closed based on the calculated θ s2. This enables the exhaust gas temperature to be raised because the amount of intake air is reduced. The normal throttle valve opening θ s1 is changed to the throttle valve cleaning opening θ s2 under ramp control shown in FIG. 5(C). In other words, the normal throttle valve opening θ s1 is changed over to the throttle valve cleaning opening θ s2 by each Δ θ s/δ t during the switchover period tc3. This is effective in alleviating shocks caused by the foregoing switchover.

In step s7, in response to the EGR passage cleaning command Sc, the turbo vane opening γ is calculated in order to obtain a value which is correctable by an amount of decrease −d γ. This calculation is conducted by the cleaning VG turbo map map4$h$ based on the engine speed Ne and the accelerator opening θ a which are shown in FIG. 4(D-2). A normal turbo vane opening γ 1 is corrected by −d γ, thereby deriving a cleaning turbo vane opening γ 2. This enables the supercharger turbine 20 to reduce exhaust gases, and raises the temperature of exhaust gases.

Figure 5D:
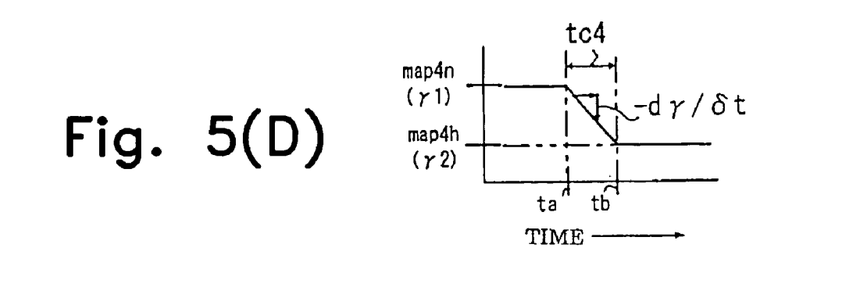
FIG. 5(D) shows the ramp control of a turbo vane opening.

Specifically, the normal turbo vane opening γ 1 is corrected to the cleaning turbo vane opening γ 2 (=γ 1−d γ) by each decrease −d γ/δ t during a switchover period tc4, under ramp control as shown in FIG. 5(D). This is effective in alleviating shocks caused by the switchover.

In step s8, it is checked whether or not predetermined waiting time Tw (e.g., 20 minutes) has lapsed. When the waiting time runs out, the cleaning turbo vane opening γ 2 is returned (in step s9) to the normal turbo vane opening γ 1 (in step s7) under ramp control. Further, the throttle valve cleaning opening θ s2 (in step s6) is returned to the normal throttle valve opening θ s1 under ramp control. Further, the maximum EGR valve opening β gmax (in step s5) is returned to the normal EGR valve opening β g1 under ramp control. Still further, the cleaning fuel injection timing Tn2 (in step s4) and the cleaning fuel injection amount Qn2 (in step s4) are respectively returned to the normal fuel injection timing Tn1 and the normal fuel injection amount Qn1 under the ramp control. In step s10, Σ Count is cleared. The control procedure returns to the main routine.

The control procedures in steps s4 to s7 are executed in response to the EGR passage cleaning command Sc. The temperature of exhaust gases from the exhaust gas manifolds is raised, so that the exhaust gas temperature near the turbine inlet becomes much higher than the exhaust manifold temperature during the normal engine operation. For instance, the exhaust gas temperature of approximately 400° C. is raised to approximately 500° C. to 550° C.

When the engine 1 is operating in response to the EGR passage cleaning command Sc, the EGR passage 43, EGR cooler 44, EGR valve 24, intake manifold 8 and so on of the EGR device 10 remain open to the maximum extents. Heated EGR exhaust gases are introduced into the EGR device via the EGR inlet 42, so that HC, soot or the like will be removed from the EGR passage. This is effective in maintaining an optimum cross-sectional area of the EGR passage, promoting smooth operations of the valves, and preventing congestion in the valves.

With the engine control system shown in FIG. 1, in order to extensively increase the temperature (500° C. to 550° C.) at the turbine inlet, i.e., the temperature Tt of the exhaust manifold, in response to the EGR passage cleaning command Sc, the following measures are taken in order to keep the maximum EGR flow rate: the main fuel injection mj is delayed by $-\Delta$ t (referred to as "the delayed main fuel injection mjL"), and the pilot fuel injection pj is conducted prior to the delayed main fuel injection mjL; the normal fuel injection amount Qn1 is increased to the cleaning fuel injection amount Qn2, which is 1.3 to 1.5 times as large as Qn1; the opening $\beta$ g of the EGR valve 24 is increased to the EGR passage cleaning opening $\beta$ g2 (large opening); the EGR flow rate is kept maximum; the normal intake throttle opening $\theta$ s1 is reduced to the cleaning throttle opening $\theta$ s2; and reducing the normal turbo vane opening $\gamma$ 1 to the cleaning turbo vane opening $\gamma$ 2. Therefore, when the EGR passage cleaning command Sc is issued, it is possible to raise the temperature of exhaust gases to be discharged into exhaust gas passage Ex under control of the ECU 7 of the engine 1. Further, the heated exhaust gases are recirculated to the EGR device 10, so that the EGR device 10 can be reliably cleaned.

Further, since the pilot fuel injection pj is conducted prior to the delayed main fuel injection mjt, fuel is reliably burnt, and exhaust gases are reliably heated in order to raise the temperature of EGR gases. Heated EGR gases can reliably clean the EGR device 10.

The normal turbo vane opening $\gamma$ 1 is reduced to the cleaning turbo vane opening $\gamma$ 2 in order to narrow the turbine inlet, which decreases the amount of exhaust gases, and raises the temperature of exhaust gases near the turbine inlet. This is effective in cleaning the EGR device 10 using hot EGR gases.

As shown in FIG. 1, the vicinity of the intake manifold 8 and the upstream side (EGR inlet 42) of the exhaust turbine 12 of the exhaust manifold 15 are connected via the EGR passage 43, and the EGR valve 24 and the recirculation gas cooler 44 are mounted on the EGR passage 43. Further, a second EGR passage 49 including a second EGR valve 48 may be placed in parallel to the EGR passage 43 as shown by dash-dot-dot lines in FIG. 1. In this case, when the EGR passage cleaning command Sc is issued, the EGR valves 24 and 48 are fully opened, and EGR gases will be recirculated to the intake passage I via the EGR passage 43 and the second EGR passage 49. Hot exhaust gases having a large flow rate can easily clean the EGR device 10. Since the second EGR passage 49 having the second EGR valve 48 is placed in parallel to the EGR passage 43, the EGR passage 43 may have a relatively small crosssectional area compared to a case where only the EGR passage 43 is provided. Therefore, the EGR valve 24 may be replaced by an EGR valve for controlling a small flow rate, so that the flow rate of EGR gases can be precisely controlled.

As stated above, the EGR passage cleaning command Sc is issued and the EGR device 10 is cleaned using hot EGR gases when the total mileage of the vehicle or the total operation periods of the engine reaches the predetermined threshold. Alternatively, the present invention may be applicable to a particulate afterburning unit for a diesel particulate filter 32.

When the total mileage or the total operation time period of the engine reaches the predetermined threshold, the diesel particulate filter (DPF) afterburning command is issued, and the temperature of the exhaust gases is raised similarly to the operation of the engine control system of FIG. 1. Hot exhaust gases (500° C. to 550° C.) are used to after-burn particulates caught on the diesel particulate filter 32. In such a case, it is possible to raise the temperature of exhaust gases only by the ECU 7 of the engine 1. Heated exhaust gases are introduced onto particulates on the diesel particulate filter, and burn particulates together with an oxidation catalyst carried by the diesel particulate filter.

INDUSTRIAL APPLICATION

The engine control system is described to be applied to a diesel engine including an exhaust gas recirculating device which recirculates exhaust gases from the exhaust unit to the intake unit. Alternatively, the engine control system is applicable to a diesel engine including an exhaust throttle valve in place of a supercharger.

What is claimed is:

1. An engine control system comprising:
a first EGR passage connecting an engine exhaust passage and an intake passage and provided with an EGR cooler and a first EGR valve;
a second EGR passage placed in parallel to the first EGR passage and provided with a second EGR valve;
an intake throttle valve placed in the intake passage; and
an engine control unit which includes an engine operation data calculator accumulating mileages of a vehicle or an engine operation period,
a fuel injection controller controlling a fuel injection amount and a fuel injection timing, an EGR valve controller controlling openings of the first and second EGR valves, a throttle valve controller controlling an opening of the intake throttle valve, and an EGR passage cleaning controller which delays the fuel injection timing, increases openings of the first and second EGR valves, and reduces an opening of the intake throttle valve when the total mileage or the total operation period calculated by the engine operation data calculator becomes equal to a predetermined threshold.

2. A method of controlling an engine which comprises an EGR device connecting an exhaust passage and an intake passage and provided with an EGR valve, and an engine control unit including an engine operation data calculator accumulating mileage of a vehicle or an engine operation period, a fuel injection controller controlling a fuel injection amount and a fuel injection timing, a controller controlling an opening of the EGR valve, a throttle valve controller controlling an opening of the intake throttle valve, the method comprising:
calculating a mileage of a vehicle or an operation time of the engine;
determining whether or not a total mileage or a total operation period of the engine is equal to or larger than a predetermined threshold; and
delaying the fuel injection timing, increasing the opening of the EGR valve, and reducing the opening of the intake throttle valve.

3. The method of claim 2 further comprising reducing an area of a turbine inlet of a supercharger mounted in the engine.

4. An engine control system comprising:

an EGR device connecting an exhaust passage and an intake passage, and including an EGR valve;

an intake throttle valve placed in the intake passage; and an engine control unit which includes an engine operation data calculator accumulating mileages of a vehicle or an engine operation period, a fuel injection controller controlling a fuel injection amount and a fuel injection timing, an EGR controller controlling an opening of the EGR valve, a throttle valve controller controlling an opening of the intake throttle valve, and an EGR passage cleaning controller which delays the fuel injection timing, increases an opening of the EGR valve, and reduces an opening of the intake throttle valve when the total mileage or the total operation period calculated by the engine operation data calculator becomes equal to a predetermined threshold.

5. The engine control system of claim 4, wherein the EGR passage cleaning controller increases the opening of the EGR valve, decreases the opening of the intake throttle valve whose opening is increased for EGR, and reduces an open area of a turbine inlet of a supercharger of the engine when the total mileage or the total operation period calculated by the engine operation data calculator becomes equal to the predetermined threshold.

6. The engine control system of claim 4, wherein the fuel injection controller not only delays a main fuel injection timing but also conducts a pilot fuel injection prior to the delayed main fuel injection when the total mileage or the total operation period calculated by the engine operation data calculator becomes equal to the predetermined threshold.

7. The engine control system of claim 6, wherein the EGR passage cleaning controller increases the opening of the EGR valve, decreases the opening of the intake throttle valve whose opening is increased for EGR, and reduces an open area of a turbine inlet of a supercharger of the engine when the total mileage or the total operation period calculated by the engine operation data calculator becomes equal to the predetermined threshold.

* * * * *